Dec. 25, 1956 M. R. GIEG 2,775,340
TYPOGRAPHICAL SLUG CASTING MACHINE
Filed July 1, 1955
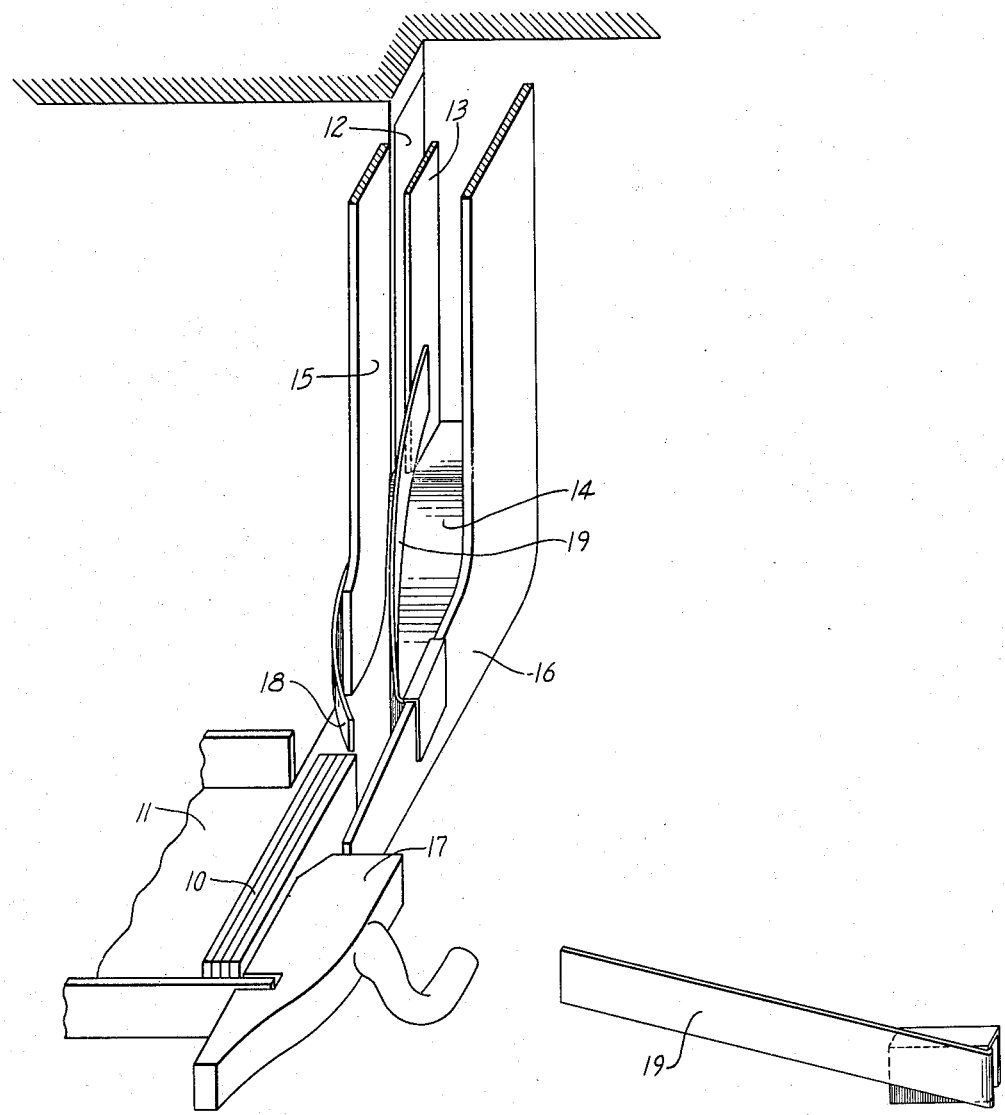
FIG_1_          FIG_2_
INVENTOR.
MELVIN R. GIEG
BY
Clarence W. Martin

2,775,340

TYPOGRAPHICAL SLUG CASTING MACHINE

Melvin R. Gieg, Concord, Calif.

Application July 1, 1955, Serial No. 519,527

5 Claims. (Cl. 199—61)

The present invention relates to typographical slug casting machines and particularly concerns means for properly guiding slugs from the slug delivery channel through the slug chute to the galley tray.

During the passage of the slug through the chute, the heated slug deposits minute particles of molten metal on the chute surface, and as the chute becomes heated due to the passage of the hot slugs, the latter tend to stick in the chute. The chute is inclined at an angle so that gravity tends to cause the slug to slide through the chute; however, any sticking tendency on the part of the slug causes the slug to turn sideways in the chute and become wedged in this position by successive slugs piling behind the initially stuck slug.

Since typographical slug casting machines are capable of producing slugs of varying thickness according to the size of type being cast, the slug delivery chute normally is made of a width sufficient to accommodate a slug of maximum width, thus providing the narrower slugs with greater opportunity to turn sideways in the chute and thus become wedged.

Prior devices for eliminating the above-mentioned difficulty includes means for mechanically adjusting one wall of the chute with respect to an opposite fixed wall to produce a chute width of desired size. In each case, such devices have been expensive to manufacture, difficult to install on existing machines, or of such complexity as to negate their relative value to the operator.

The present invention provides a simple device which automatically adjusts itself to the size of slug being ejected from the delivery platform and which produces a chute wall of a minimum optimum width thus obtaining the conditions required for free delivery of the slug to the galley tray. Furthermore, this device is easily removed from one machine and transferred to another, thus permitting many installations at a minimum expense.

Fig. 1 is a projection as seen from the right front of the galley tray showing the tray, the chute, a portion of the delivery platform, and the device of the present invention fixed on one wall of the chute.

Fig. 2 is a left side view of the device.

A plurality of slugs 10 (Fig. 1) are shown in terminal position on a galley tray 11. The slugs are initially discharged, one at a time, from a mold (not shown) and are ejected from a discharge platform comprising a fixed wall 12 and a plate 13 which is spring urged against wall 12 in known manner.

A delivery chute comprising an inclined floor 14 bounded by side plates 15 and 16 is provided to restrict the slug during its passage into place in front of the slug lever 17 which at such time stands spaced apart and to the right of the previously made slug. Shortly thereafter, the slug lever advances all of the slugs one increment to the left in preparation to receive the next slug. An auxiliary plate 18 usually is fixed to plate 15 to increase the effective length of the chute and to deflect the slug to the right in front of the slug lever.

It will be observed that the chute is shown as being considerably wider than the slugs which commonly is the case where the machine is employed to produce a wide range of slug widths.

According to the present invention, the effective width of the chute is decreased to the optimum size required for the passage of a slug of any width by the following means. A leaf spring 19 is detachably secured to the right side plate 16 and extends substantially the full length of the chute with the upper end thereof lying adjacent the spring plate 13. Any convenient means may be provided for attaching the leaf spring 19 to the plate 16; however, for ease of attachment and simplicity of manufacture, I prefer to form the attaching means as an integral part of the leaf spring. For this purpose, the leaf spring is made as an extension of an inverted U-shaped clip which extension is bent rearwardly upon itself by the requisite amount to contact the spring plate 13 under tension. This serves to place both the leaf spring and the clip under a slight tension, although the clip preferably fits the plate 16 snugly in the absence of such tension.

It will be noted that the leaf spring forms an angle with the top of the clip proper so that the opposite end of the leaf spring abuts the spring plate 13 slightly above the lower extremity of the spring plate. Thus, as a slug emerges from the spring plate, it is confined between plate 15 and the leaf spring for the major portion of its travel down the chute. When slugs of larger width are produced, and the spring plate 13 is moved farther to the right as the slug emerges, the leaf spring is accordingly moved to the right by an equivalent amount, thus automatically adjusting the latter to the size of slug being produced.

With the present invention in use, I have found that slugs are prevented from sticking in the chute regardless of the length of time the machine is in use, and regardless of the size of slugs being produced, whereas in the absence of such a device, considerable time was lost not only in straightening wedged slugs, but also in attempting to prevent the sticking of the slugs by removal of metal deposits from the chute.

I claim:

1. In a typographical slug casting machine having a movable spring plate, a galley tray, and a chute for guiding a slug from the spring plate to the galley tray; yieldable means extending diagonally substantially the length of the chute and into contact with the spring plate whereby movement of the spring plate adjusts the diagonal angle of the yieldable means.

2. In a typographical slug casting machine, in which the slug emerges between a side wall and a spring plate, a galley tray, and a chute comprising an inclined floor and a pair of opposed side plates for guiding the slug from the point of emergence to the galley tray; yieldable means fixed to one of said chute side plates and extending diagonally within the chute into contact with a portion of said spring plate whereby the spring plate moves the yieldable means in a direction substantially transversely of the axis of the chute.

3. In a typographical slug casting machine adapted to cast slugs of various widths, means for guiding a slug from a point of emergence between a fixed portion of the machine and a spring plate to a galley tray, comprising a chute having a width at least as great as the width of the maximum width slug; means for altering the effective width of the chute in accordance with the width of slug being cast, including: a yieldable means fixed to one wall of said chute and extending within the chute to a point of contact with a portion of the spring plate whereby movement of the spring plate during emergence of the slug causes deflection of the yieldable means by an amount proportional to the width of the slug.

4. A typographical slug casting machine including a delivery chute in communication with a slug discharge platform and a galley tray, said discharge platform including a spring plate normally standing adjacent a fixed portion of the machine, and means for discharging slug past the spring plate whereupon the latter yields to permit such discharge; auxiliary chute delivery means comprising a yieldable member mounted on a portion of said chute proximate said galley tray and extending diagonally of said chute rearwardly into contact with said spring plate to thereby diminish the transverse dimension of the chute, and means comprising said spring plate responsive to movement of the slug during discharge of the same for moving said auxiliary means in a direction to increase said dimension.

5. In a typographical slug casting machine having a slug discharge platform comprising a movable spring plate, a galley tray, a chute for transporting slugs from the discharge platform to the galley tray, said chute including an inclined floor and opposed side walls, one of which walls stands adjacent the slug receiving end of the galley tray, a yieldable member located within said chute extending diagonally from said one wall of the chute to a point of contact with the spring plate thereby diminishing the width of the delivery chute in accordance with the position of the spring plate, and means for detachably connecting the yieldable member to said one wall of the chute.

References Cited in the file of this patent

UNITED STATES PATENTS

| | | |
|---|---|---|
| 1,379,892 | Alderdice | May 31, 1921 |
| 1,643,540 | Bunn | Sept. 27, 1927 |
| 1,925,968 | Padgett et al. | Sept. 5, 1933 |
| 2,056,074 | Peterson | Sept. 29, 1936 |